United States Patent
Schmier, II

(10) Patent No.: US 7,736,109 B2
(45) Date of Patent: Jun. 15, 2010

(54) MULTI-POSITION BALL LOCK/QUICK RELEASE PIN BUSHING/RETAINER

(75) Inventor: Mark A. Schmier, II, Mesa, AZ (US)

(73) Assignee: The Boeing Company, Chicago, IL (US)

(*) Notice: Subject to any disclaimer, the term of this patent is extended or adjusted under 35 U.S.C. 154(b) by 421 days.

(21) Appl. No.: 11/644,810

(22) Filed: Dec. 21, 2006

(65) Prior Publication Data

US 2008/0152457 A1 Jun. 26, 2008

(51) Int. Cl.
*F16B 21/00* (2006.01)
(52) U.S. Cl. ............... 411/348; 292/252; 244/137.4
(58) Field of Classification Search ............... 411/344, 411/348; 292/252; 244/137.4, 137.1
See application file for complete search history.

(56) References Cited

U.S. PATENT DOCUMENTS

| | | | | |
|---|---|---|---|---|
| 1,635,144 | A * | 7/1927 | Stevens, Jr. ............ | 74/334 |
| 2,837,942 | A * | 6/1958 | Howell ............ | 408/241 R |
| 3,026,749 | A * | 3/1962 | Miller et al. ............ | 408/72 R |
| 3,349,649 | A * | 10/1967 | Mele ............ | 408/241 R |
| 3,361,388 | A | 1/1968 | Girard et al | |
| 3,391,244 | A * | 7/1968 | Moll ............ | 174/40 R |
| 3,521,895 | A * | 7/1970 | Smith ............ | 279/22 |
| 3,617,081 | A * | 11/1971 | Drucker ............ | 292/252 |
| 4,168,047 | A * | 9/1979 | Hasquenoph et al. | 244/137.4 |
| 4,269,550 | A * | 5/1981 | DiGiulio ............ | 408/241 B |
| 4,365,535 | A * | 12/1982 | Buttner et al. ............ | 84/421 |
| 4,741,505 | A | 5/1988 | Anderson | |
| 4,843,792 | A * | 7/1989 | Rogers et al. ............ | 52/127.7 |
| 5,002,002 | A | 3/1991 | Awalt, Jr. | |
| 5,014,037 | A * | 5/1991 | McDonald ............ | 338/163 |
| 5,146,655 | A | 9/1992 | Gibbs | |
| 5,181,725 | A | 1/1993 | Leras | |
| 5,240,086 | A | 8/1993 | Hopely, Jr. | |
| 5,484,243 | A * | 1/1996 | Yacobovitch ............ | 411/353 |
| 6,019,484 | A | 2/2000 | Seyler | |
| 6,532,702 | B1 * | 3/2003 | Scribner ............ | 52/202 |

(Continued)

FOREIGN PATENT DOCUMENTS

DE 4232688 3/1994

OTHER PUBLICATIONS

International Search Report and Written Opinion of the International Searching Authority, Int. Application No. PCT/US2007/022235, Feb. 11, 2009, European Patent Office.

*Primary Examiner*—Gary Estremsky
(74) *Attorney, Agent, or Firm*—Toler Law Group

(57) ABSTRACT

An exemplary retaining assembly for a ball lock pin includes a bushing assembly configured to attachably engage an object. The bushing assembly has an inner surface and an outer surface. The inner surface defines an engagement portion configured to receive locking balls urged therein in engagement. The outer surface is configured to be received within the object. The bushing assembly can include any suitable bushing member as desired, such as a press fit bushing, a serrated press fit bushing, a diamond knurl bushing, a key insert bushing, a template bushing, and the like. The bushing assembly can be a lock bushing configured to receive therein a lock ring. The lock ring can be inserted into the lock bushing and around a tapered portion of a shaft of a ball lock pin to help prevent the ball lock pin from being removed from the bushing assembly.

11 Claims, 12 Drawing Sheets

U.S. PATENT DOCUMENTS 6,641,343 B1 * 11/2003 Duran .................... 411/372.6
2003/0219325 A1    11/2003 Schultz
2005/0095079 A1    5/2005 Beckers
2006/0134957 A1    6/2006 Cornwell

* cited by examiner

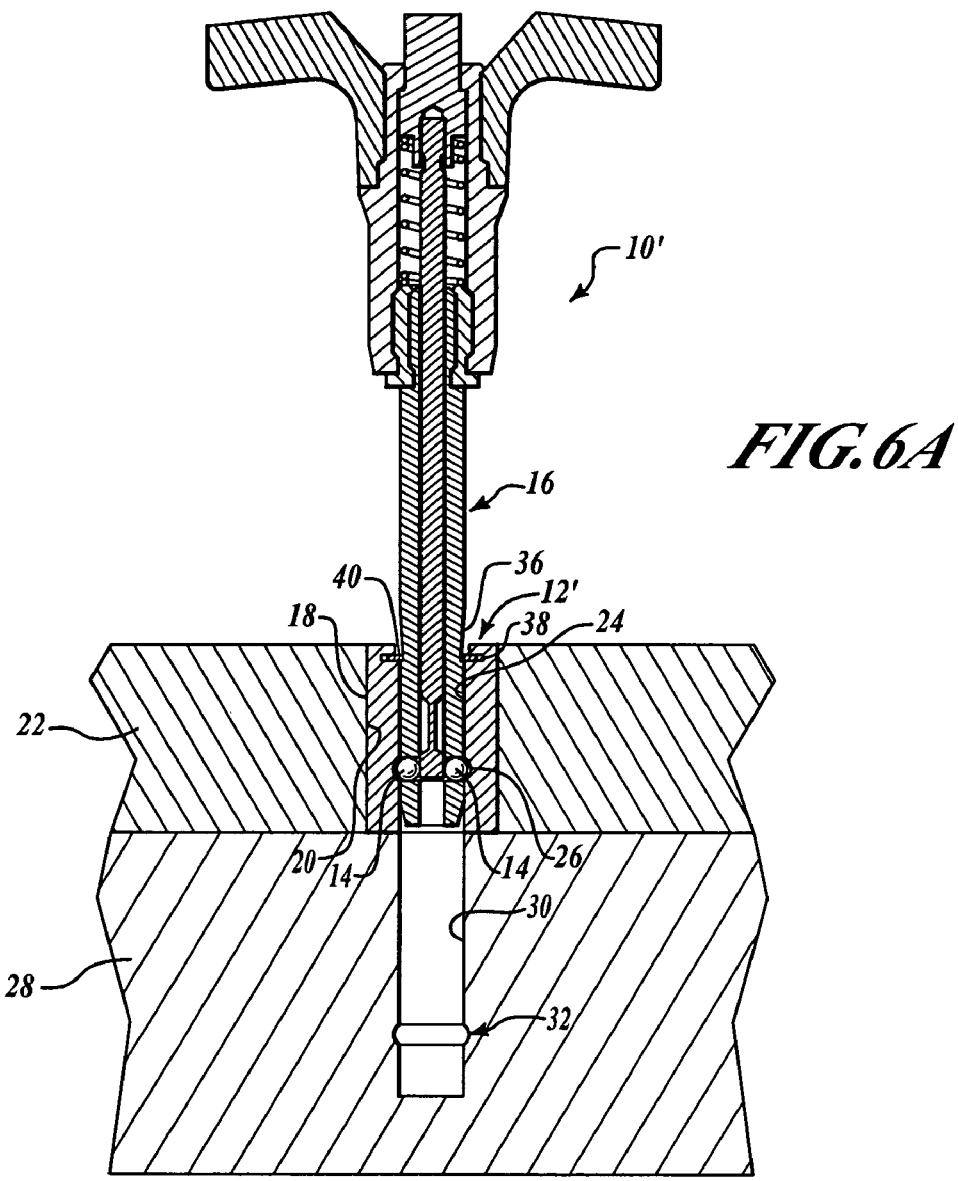
FIG. 6A
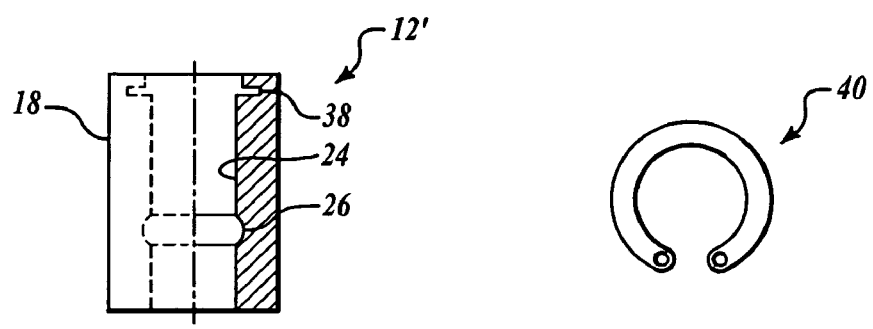 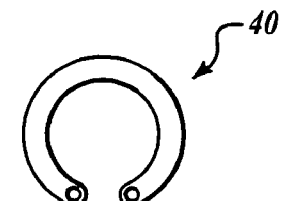
FIG. 6B    FIG. 6C

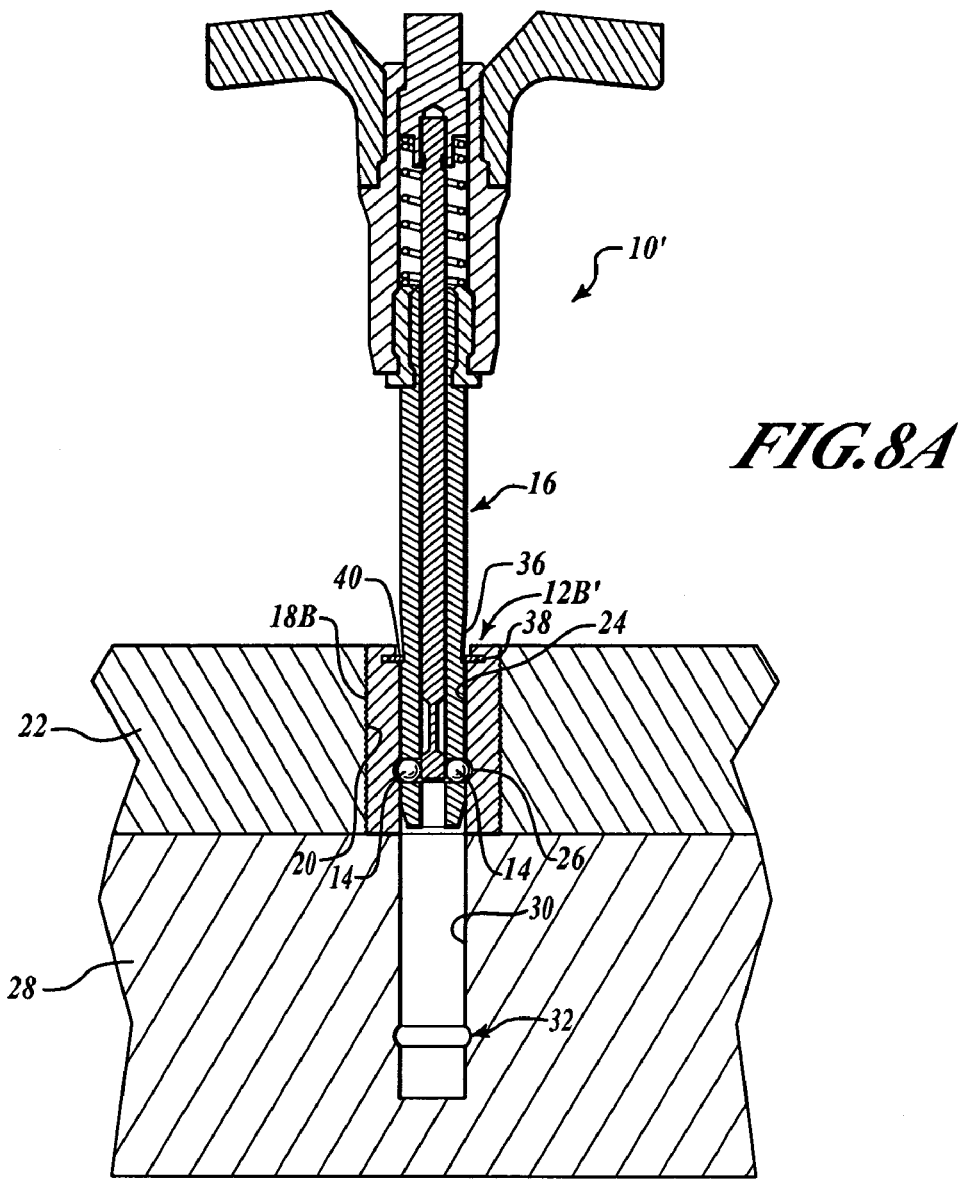
*FIG.8A*
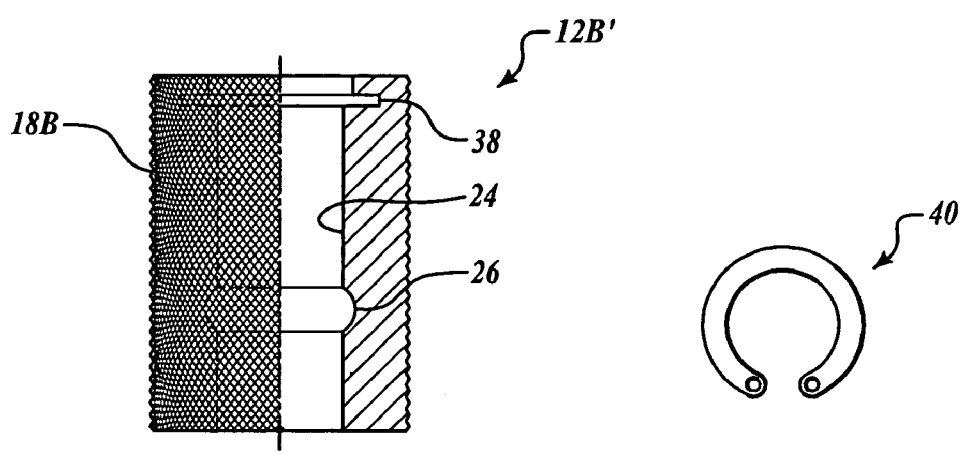
*FIG.8B*   *FIG.8C*

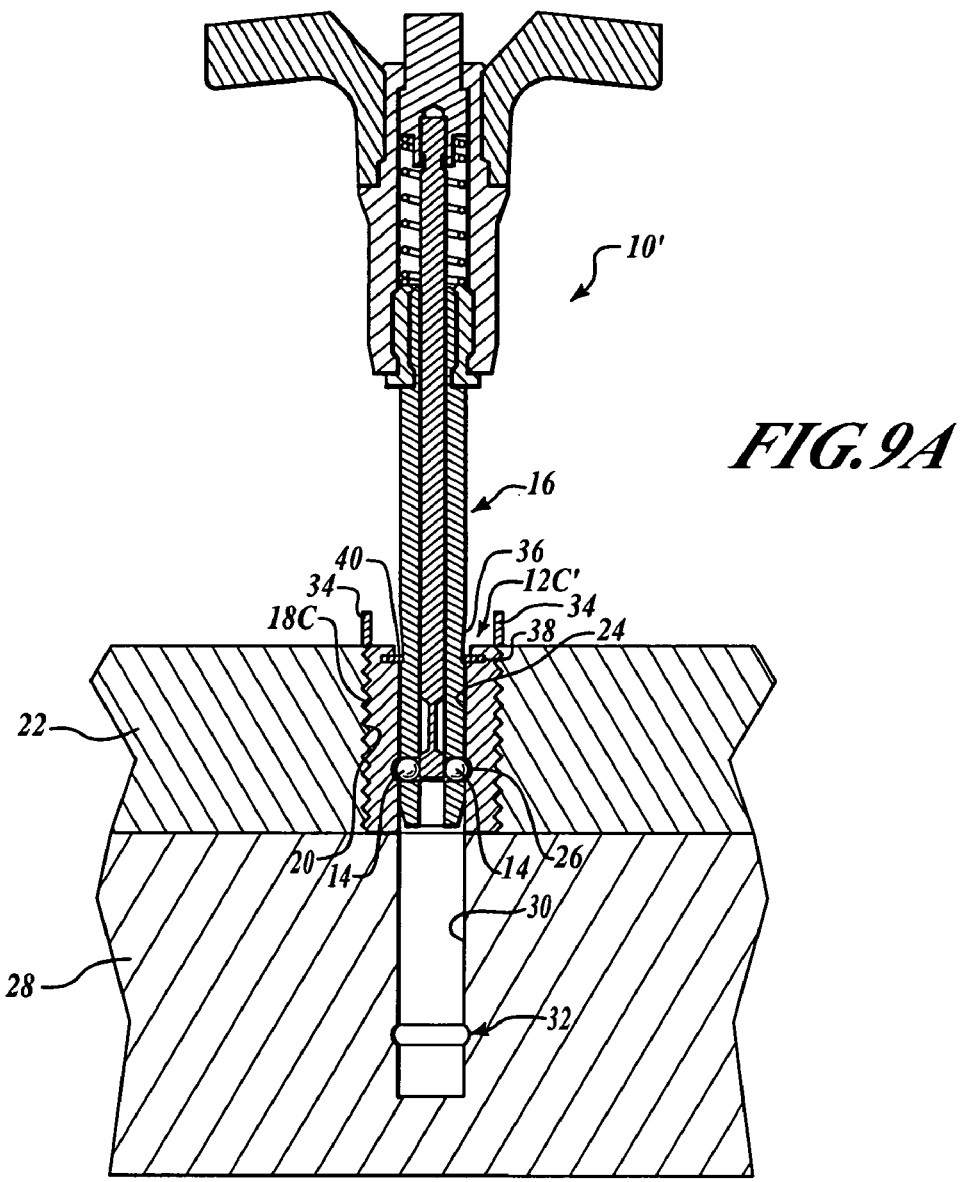
*FIG.9A*
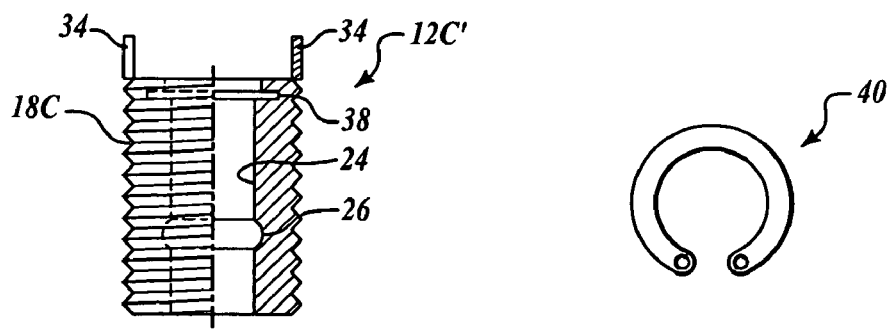
*FIG.9B*  *FIG.9C*

MULTI-POSITION BALL LOCK/QUICK RELEASE PIN BUSHING/RETAINER

BACKGROUND

Ball lock pins are used in a number of applications and settings to provide a quickly releasable attachment between two objects, items, workpieces, or the like. With the ball lock pin received through a hole in one of the objects, locking balls in the ball lock pin are urged outwardly to provide positive locking engagement between the ball lock pin and the other object, thereby holding the two objects in releasable attachment to each other.

However, when the locking balls are retracted and the ball lock pin is removed from positive locking engagement, the ball lock pin is no longer maintained in locking engagement with either of the objects. Unless the ball lock pin is tethered with a lanyard to one of the objects, the ball lock pin can be dropped and may possibly be lost.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In an exemplary embodiment, a retaining assembly for a ball lock pin includes a bushing assembly that is configured to attachably engage an object. The bushing assembly has an inner surface and an outer surface. The inner surface defines an engagement portion, such as without limitation a radial groove, configured to receive locking balls urged therein in engagement. The outer surface is configured to be received within the object.

According to an aspect, the bushing assembly can include any suitable bushing member as desired. For example and without limitation, the bushing assembly can include bushing members such as a press fit bushing, a serrated press fit bushing, a diamond knurl bushing, a key insert bushing, a template bushing, and the like.

According to another aspect, the bushing assembly can be a lock bushing that is configured to receive therein a lock ring. The lock ring can be inserted into the lock bushing and around a tapered portion of a shaft of a ball lock pin to help prevent the ball lock pin from being removed from the bushing assembly.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6A is a cross sectional view of a tapered ball lock pin received in an exemplary locking press fit bushing assembly;

FIGS. 6B and 6C are plan views of details of the bushing assembly of FIG. 6A;

FIG. 8A is a cross sectional view of a tapered ball lock pin received in an exemplary locking diamond knurl bushing assembly;

FIGS. 8B and 8C are plan views of details of the bushing assembly of FIG. 8A;

FIG. 9A is a cross sectional view of a tapered ball lock pin received in an exemplary locking threaded key insert bushing assembly;

FIGS. 9B and 9C are plan views of details of the bushing assembly of FIG. 9A;

FIGS. 10B, 10C, and 10D are plan views of details of the bushing assembly of FIG. 10A.

DETAILED DESCRIPTION

By way of overview, an exemplary retaining assembly for a ball lock pin includes a bushing assembly configured to attachably engage an object. The bushing assembly has an inner surface and an outer surface. The inner surface defines an engagement portion configured to receive locking balls urged therein in engagement. The outer surface is configured to be received within the object. The bushing assembly can include any suitable bushing member as desired for a particular application, such as a press fit bushing, a serrated press fit bushing, a diamond knurl bushing, a key insert bushing, a template bushing, and the like. If desired, the bushing assembly can be a lock bushing configured to receive therein a lock ring. The lock ring can be inserted into the lock bushing and around a tapered portion of a shaft of a ball lock pin to help prevent the ball lock pin from being removed from the bushing assembly.

Figure 1A:
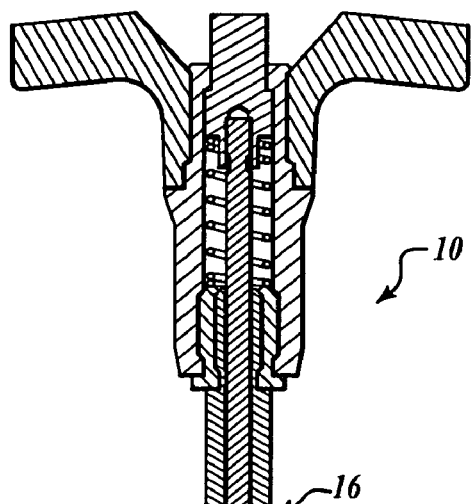
FIG. 1A is a cross sectional view of a ball lock pin received in an exemplary press fit bushing assembly.
Figure 1B:
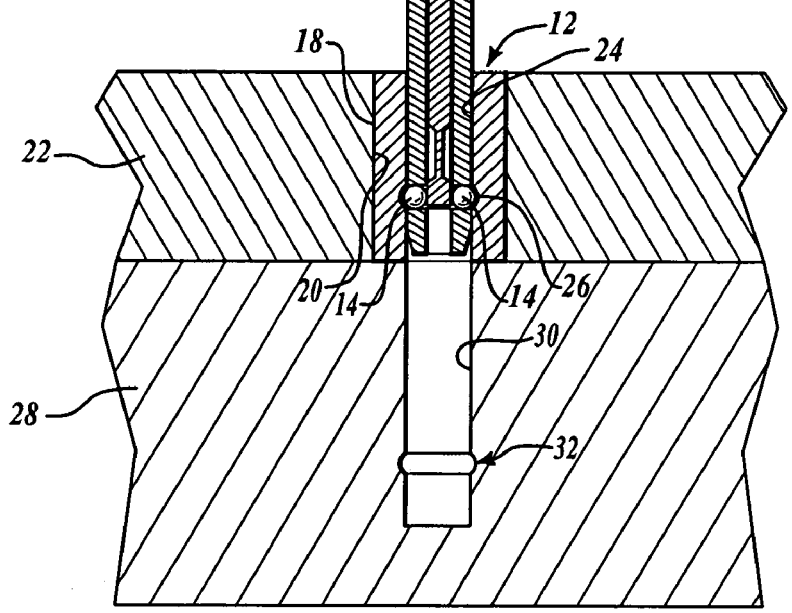
FIG. 1B is a cross sectional view of details of the bushing assembly of FIG. 1A.
Figure 1B:
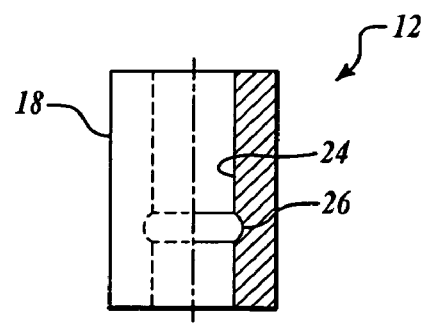

Referring now to FIGS. 1A and 1B, a ball lock pin 10 is received in engagement in an exemplary bushing 12. The ball lock pin 10 suitably is any known ball lock pin as desired. Locking balls 14 are disposed on a shaft 16 in a known manner such that the locking balls 14 can be urged outwardly to engage a workpiece as desired. Ball lock pins are well known in the art, and therefore a detailed description of construction and operation of the ball lock pin 10 is not necessary for an understanding.

In an exemplary embodiment, the bushing 12 is a press fit bushing. The bushing 12 has a surface 18 that is configured to be press fit into a surface 20 of an object 22. The object 20 may be any object as desired for a particular application and is not intended to be limited in any manner whatsoever.

The bushing 12 has a surface 24 that is configured to receive therein the shaft 16. An engagement portion 26, such as without limitation a concave radial groove, is defined in the surface 24. The engagement portion 26 is sized to receive therein the locking balls 14 when the locking balls 14 are urged outwardly. The locking balls 14 engage the engagement portion 26 to retain the ball lock pin 10 in the bushing 12. Because the bushing 12 is press fit into the object 22, the ball lock pin 10 thus remains with the object 22. By keeping the ball lock pin 10 with the object 22, the bushing 12 helps prevent the ball lock pin 10 from being dropped or possibly becoming lost.

With the ball lock pin 10 engaged within the bushing 12 as described above, the object 22 may be aligned with an object 28. The object 28 may be any object as desired for a particular application and is not intended to be limited in any manner whatsoever. The object 28 has a surface 30 that defines an engagement portion 32, such as a concave radial groove, as described above for the engagement portion 26. The shaft 16 can be inserted into the object 28 and the locking balls 14 can be urged outwardly to engage the engagement portion 32 in the same manner as described above, Thus, the ball lock pin 10 can attach the objects 22 and 28.

Figure 2A:
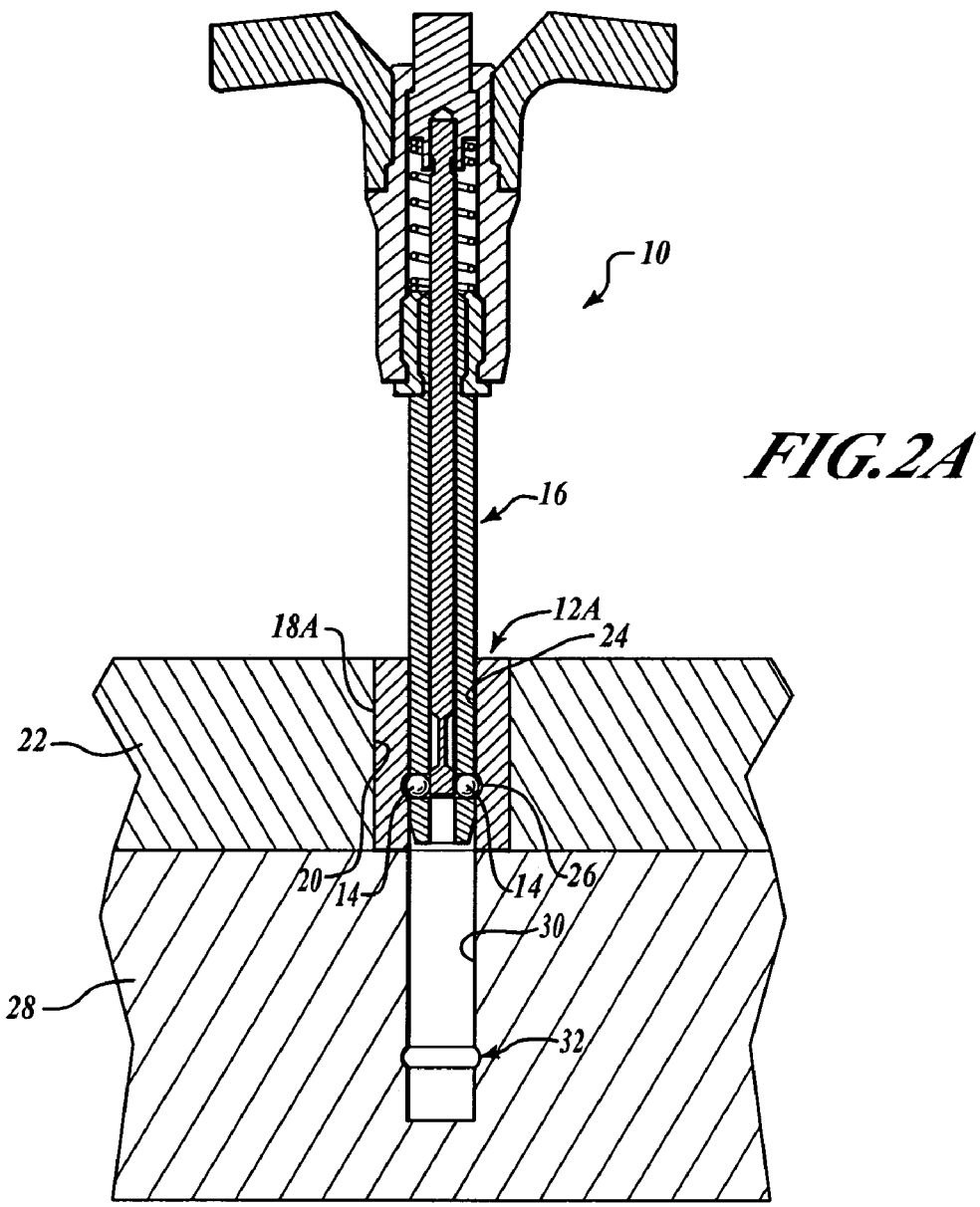
FIG. 2A is a cross sectional view of a ball lock pin received in an exemplary serrated press fit bushing assembly.
Figure 2B:
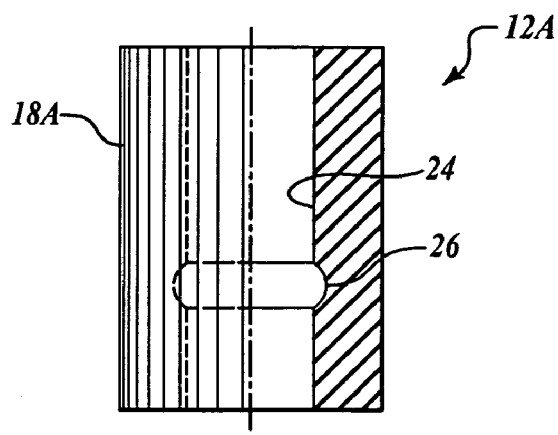
FIG. 2B is a cross sectional view of details of the bushing assembly of FIG. 2A.

Referring now to FIGS. 2A and 2B, the ball lock pin 10 is received in engagement in an exemplary bushing 12A. The bushing 12A is a serrated press fit bushing that has a serrated surface 18A that is press fit into the surface 20 of the object 22. All other details of the bushing 12A are the same as the bushing 12 (FIGS. 1A and 1B) set forth above, and details of the ball lock pin 10 (FIG. 1A) and the objects 22 and 28 (FIG. 1A) are set forth above. Therefore, their repetition is not necessary for an understanding. Like reference numbers refer to the same features described above.

Figure 3A:
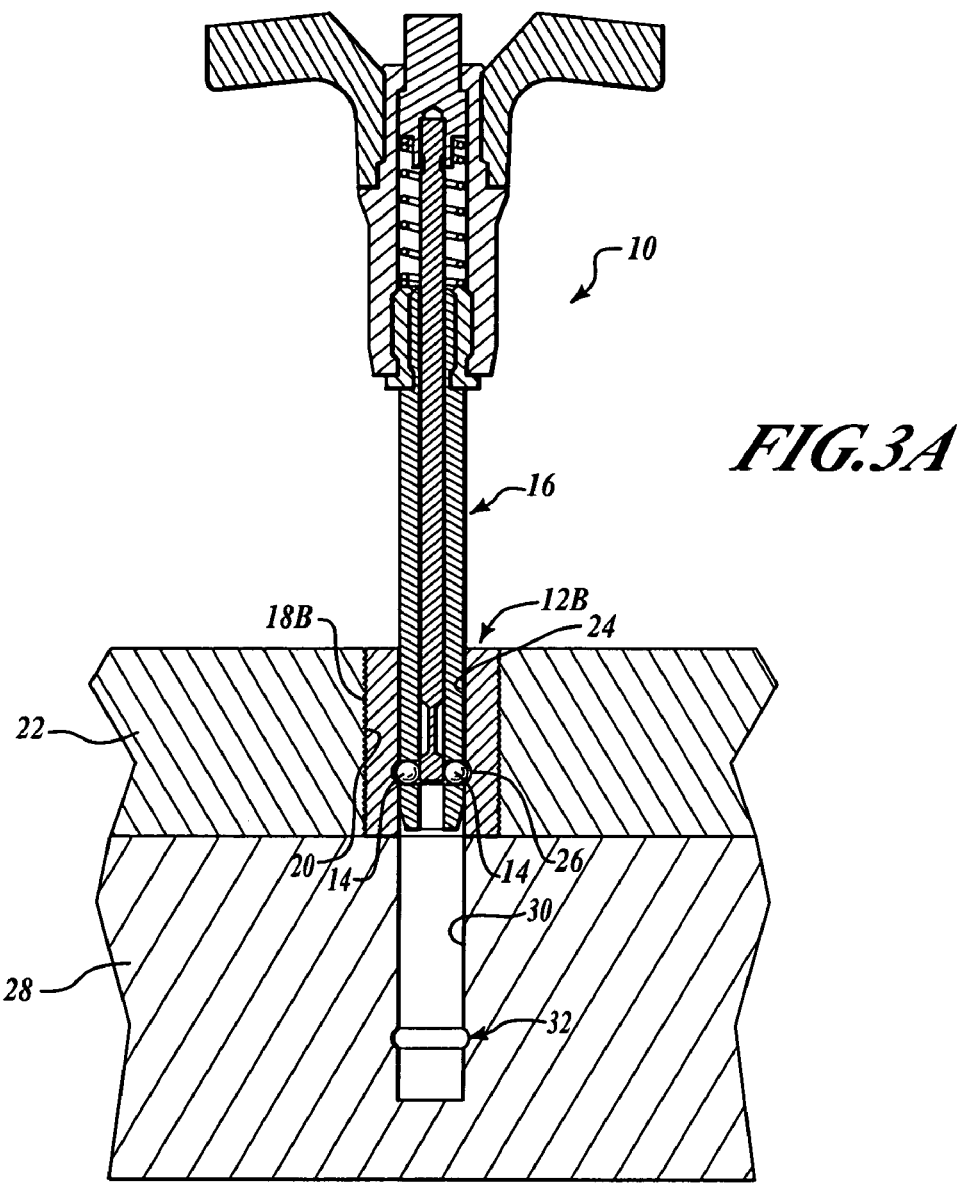
FIG. 3A is a cross sectional view of a ball lock pin received in an exemplary diamond knurl bushing assembly.
Figure 3B:
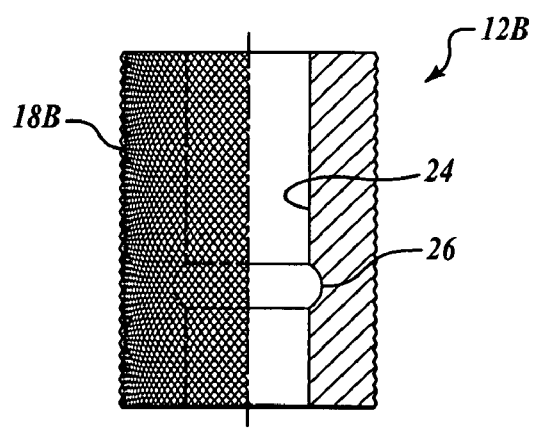
FIG. 3B is a cross sectional view of details of the bushing assembly of FIG. 3A.

Referring now to FIGS. 3A and 3B, the ball lock pin 10 is received in engagement in an exemplary bushing 12B. The bushing 12B is a diamond knurl bushing that has a diamond knurl surface 18B that is bonded with the surface 20 of the object 22 with a potting compound (not shown). All other details of the bushing 12B are the same as the bushing 12 (FIGS. 1A and 1B) set forth above, and details of the ball lock pin 10 (FIG. 1A) and the objects 22 and 28 (FIG. 1A) are set forth above. Therefore, their repetition is not necessary for an understanding. Like reference numbers refer to the same features described above.

Figure 4A:
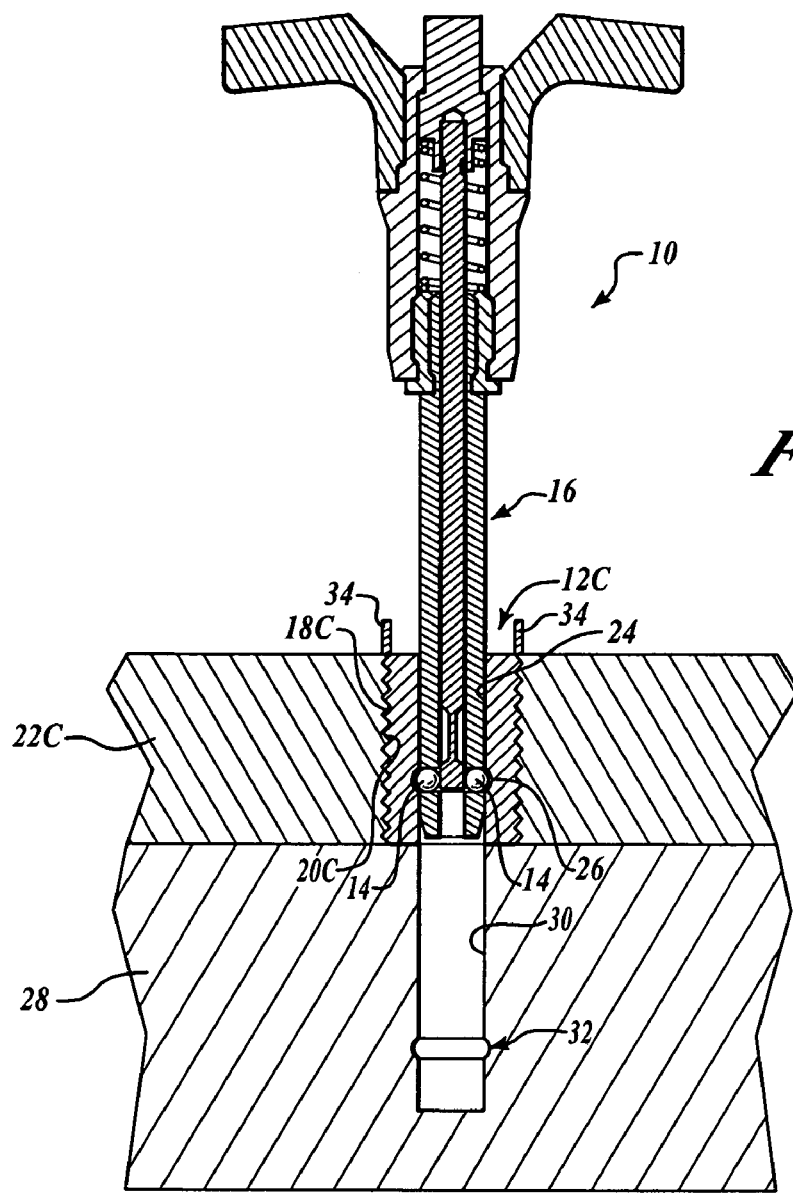
FIG. 4A is a cross sectional view of a ball lock pin received in an exemplary threaded key insert bushing assembly.
Figure 4B:
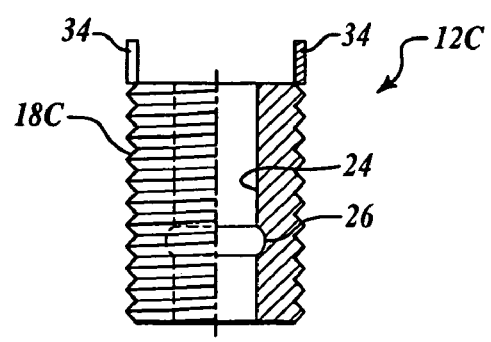
FIG. 4B is a cross sectional view of details of the bushing assembly of FIG. 4A.

Referring now to FIGS. 4A and 4B, the ball lock pin 10 is received in engagement in an exemplary bushing 12C. The bushing 12C is a threaded key insert bushing that has a threaded surface 18C that threadedly engages a threaded surface 20C of an object 22C. Key inserts 34 are provided to stake the bushing 12C to the object 22C. All other details of the bushing 12B and the object 22C (FIG. 1A) are the same as the bushing 12 (FIGS. 1A and 1B) and the object 22 (FIG. 1A) set forth above, and details of the ball lock pin 10 (FIG. 1A) and the object 28 (FIG. 1A) are set forth above. Therefore, their repetition is not necessary for an understanding. Like reference numbers refer to the same features described above.

Figure 5A:
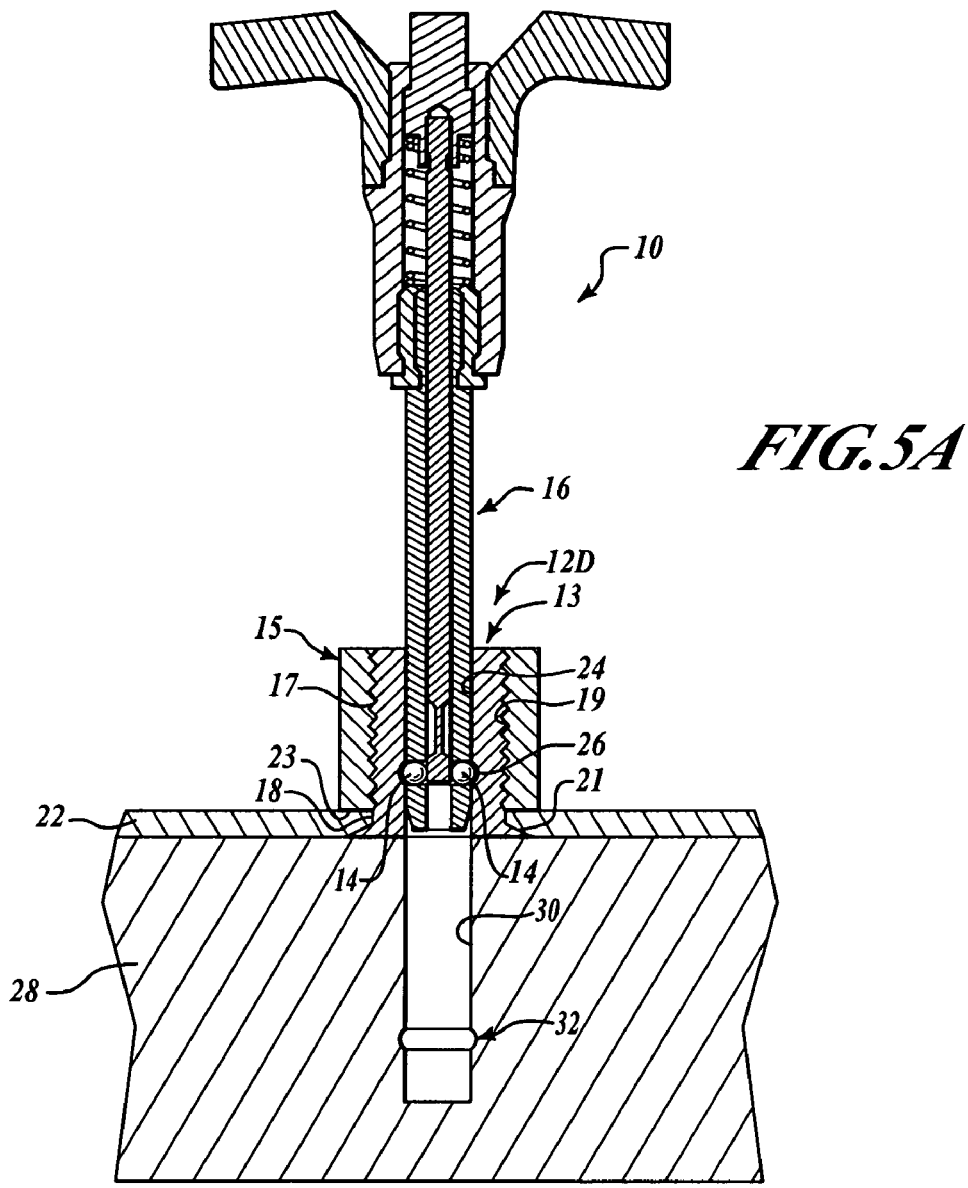
FIG. 5A is a cross sectional view of a ball lock pin received in an exemplary template bushing assembly.
Figures 5B, 5C:
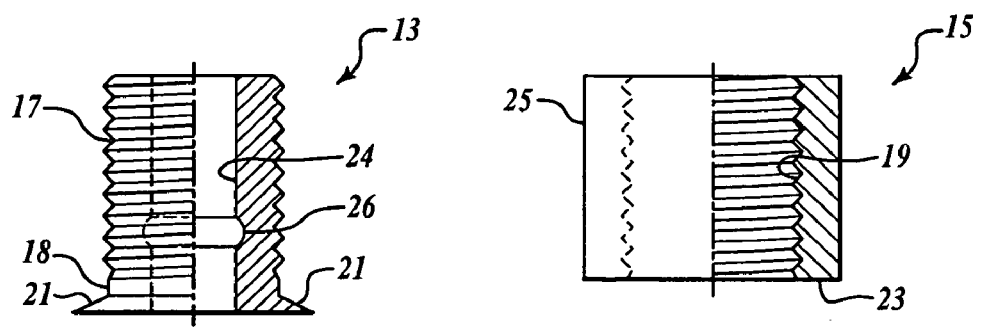
FIGS. 5B and 5C are cross sectional views of details of the bushing assembly of FIG. 5A.

Referring now to FIGS. 5A, 5B, and 5C, the ball lock pin 10 is received in engagement in an exemplary bushing 12D. The bushing 12D is a template bushing that is made up of a template bushing member 13 and a locking sleeve 15. The template bushing member 13 defines the surface 24 and the engagement portion 26. The template bushing member 13 also defines a threaded surface 17 and an engagement land 21. The locking sleeve 15 defines a threaded surface 19, an engagement surface 23, and an outer surface 25. The template bushing member 13 is received in a counter-sunk opening in the object 22 such that a top surface of the engagement land 21 contacts a surface of the counter-sunk opening of the object 22. The locking sleeve 15 is threaded onto the template bushing member 13. The threaded surface 19 threadedly engages the threaded surface 17 until the engagement surface 23 of the locking sleeve 15 engages a top surface of the object 22, thereby attaching the template bushing 12D to the object 22. Details of the ball lock pin 10 (FIG. 1A) and the objects 22 and 28 (FIG. 1A) are set forth above. Therefore, their repetition is not necessary for an understanding. Like reference numbers refer to the same features described above.

Referring now to FIGS. 6A, 6B, and 6C, a ball lock pin 10' is received in engagement in an exemplary locking press fit bushing 12'. A portion 36 of the shaft 16 of the ball lock pin 10' is tapered, such as by milling on a mill or other suitable method. The bushing 12' defines a radial lock groove 38 that is sized to receive therein a lock ring 40. The lock ring 40 can be inserted into the lock groove 38 around the tapered portion 36 to help prevent the ball lock pin 10' from being removed from the bushing 12'. All other details of the bushing 12' and the ball-lock pin 10' are the same as the bushing 12 (FIGS. 1A and 1B) and the ball lock pin 10 (FIG. 1A) set forth above, and details of the objects 22 and 28 (FIG. 1A) are set forth above. Therefore, their repetition is not necessary for an understanding. Like reference numbers refer to the same features described above.

Figure 7A:
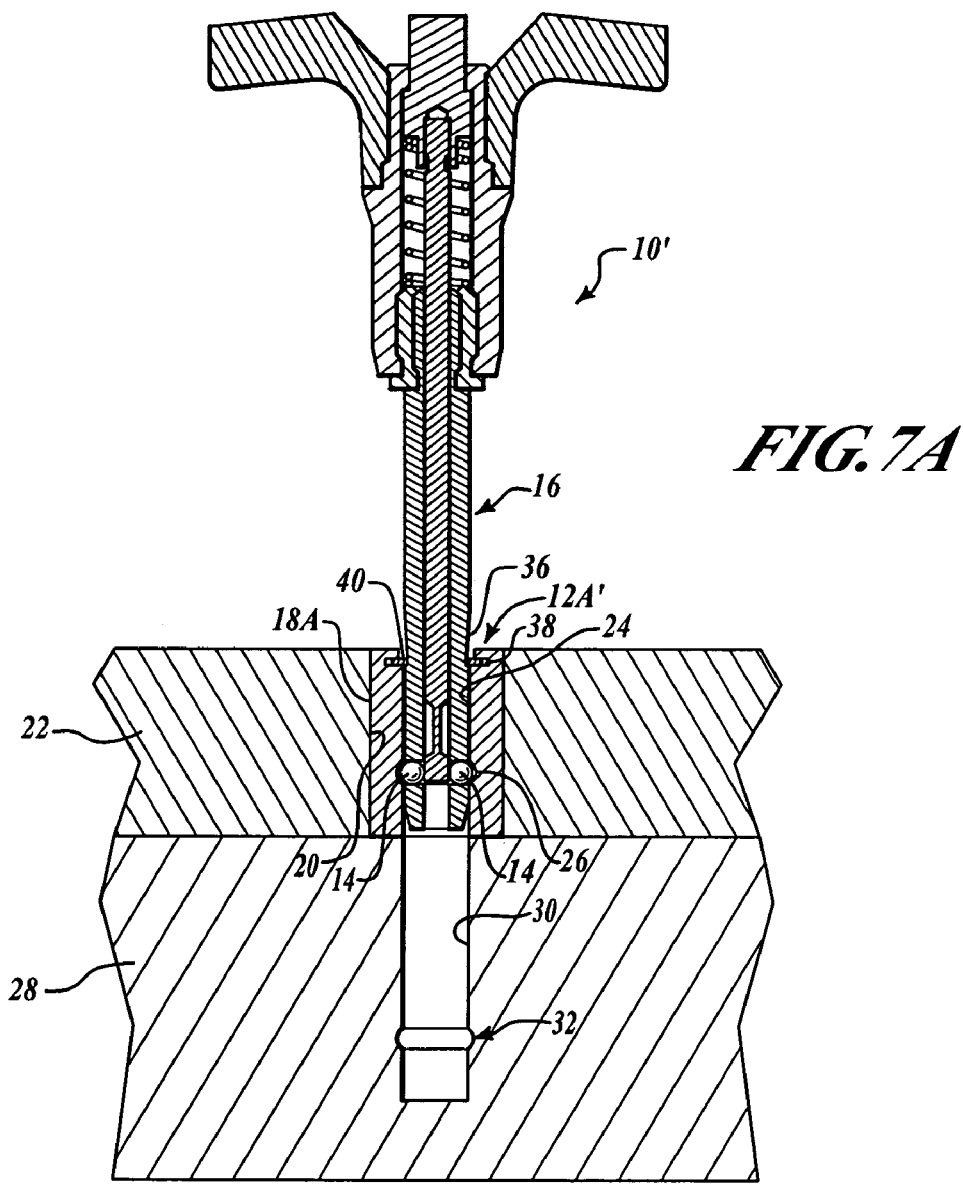
FIG. 7A is a cross sectional view of a tapered ball lock pin received in an exemplary locking serrated press fit bushing assembly.
Figure 7B:
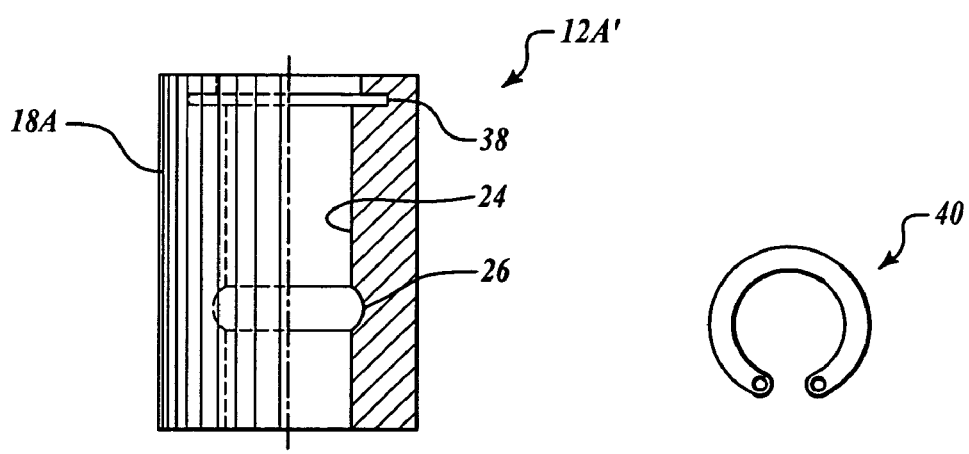
FIGS. 7B and 7C are plan views of details of the bushing assembly of FIG. 7A.
Figure 7C:
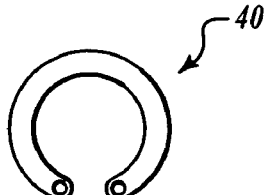
Figure 10A:
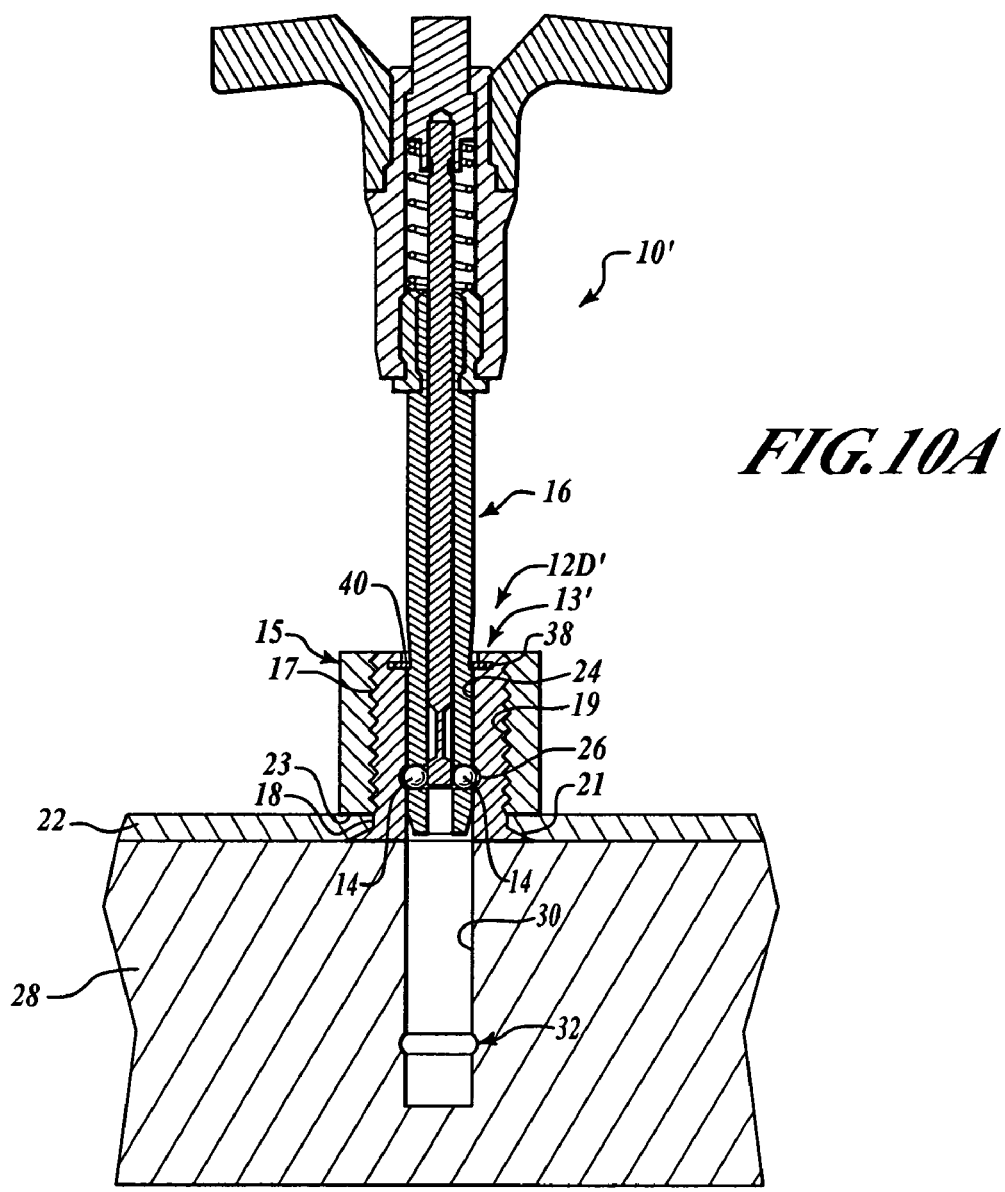
FIG. 10A is a cross sectional view of a tapered ball lock pin received in an exemplary locking template bushing assembly.
Figure 10A:
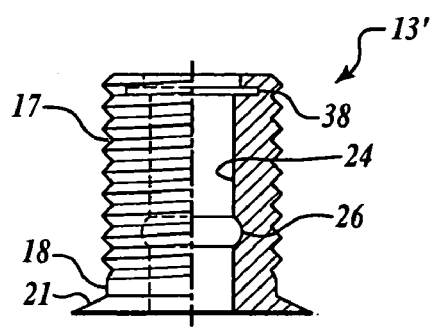
Figure 10A:
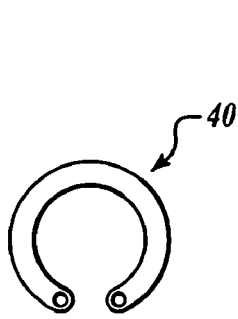
Figure 10A:
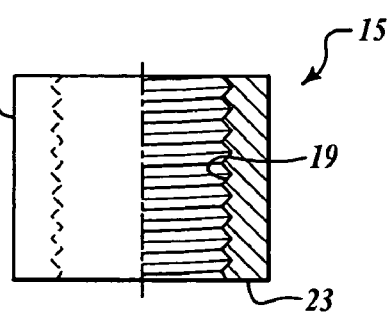

Referring now to FIGS. 7A, 7B, and 7C, the ball lock pin 10' is received in engagement in an exemplary locking serrated press fit bushing 12A'. The bushing 12A' defines the radial lock groove 38 that is sized to receive therein the lock ring 40. The lock ring 40 can be inserted into the lock groove 38 around the tapered portion 36 to help prevent the ball lock pin 10' from being removed from the bushing 12A'. All other details of the bushing 12A' are the same as the bushing 12A (FIGS. 2A and 2B) set forth above, and details of ball lock pin 10' (FIG. 6A) and the objects 22 and 28 (FIG. 1A) are set forth above. Therefore, their repetition is not necessary for an understanding. Like reference numbers refer to the same features described above.

Referring now to FIGS. 8A, 8B, and 8C, the ball lock pin 10' is received in engagement in an exemplary locking diamond knurl bushing 12B'. The bushing 12B' defines the radial lock groove 38 that is sized to receive therein the lock ring 40. The lock ring 40 can be inserted into the lock groove 38 around the tapered portion 36 to help prevent the ball lock pin 10' from being removed from the bushing 12B'. All other details of the bushing 12B' are the same as the bushing 12B (FIGS. 3A and 3B) set forth above, and details of ball lock pin 10' (FIG. 6A) and the objects 22 and 28 (FIG. 1A) are set forth above. Therefore, their repetition is not necessary for an understanding. Like reference numbers refer to the same features described above.

Referring now to FIGS. 9A, 9B, and 9C, the ball lock pin 10' is received in engagement in an exemplary locking threaded key insert bushing 12C'. The bushing 12C' defines the radial lock groove 38 that is sized to receive therein the lock ring 40. The lock ring 40 can be inserted into the lock groove 38 around the tapered portion 36 to help prevent the ball lock pin 10' from being removed from the bushing 12C'.

All other details of the bushing 12C' are the same as the bushing 12C (FIGS. 4A and 4B) set forth above, and details of ball lock pin 10' (FIG. 6A) and the objects 22 and 28 (FIG. 1A) are set forth above. Therefore, their repetition is not necessary for an understanding. Like reference numbers refer to the same features described above.

Referring now to FIGS. 10A, 10B, 10C, and 10D, the ball lock pin 10' is received in engagement in an exemplary locking template bushing 12D'. A template bushing member 13' defines the radial lock groove 38 that is sized to receive therein the lock ring 40. The lock ring 40 can be inserted into the lock groove 38 around the tapered portion 36 to help prevent the ball lock pin 10' from being removed from the bushing 12D'. All other details of the bushing 12D' are the same as the bushing 12D (FIGS. 5A, 5B, and 5C) set forth above, and details of ball lock pin 10' (FIG. 6A) and the objects 22 and 28 (FIG. 1A) are set forth above. Therefore, their repetition is not necessary for an understanding. Like reference numbers refer to the same features described above.

Figure 11A:
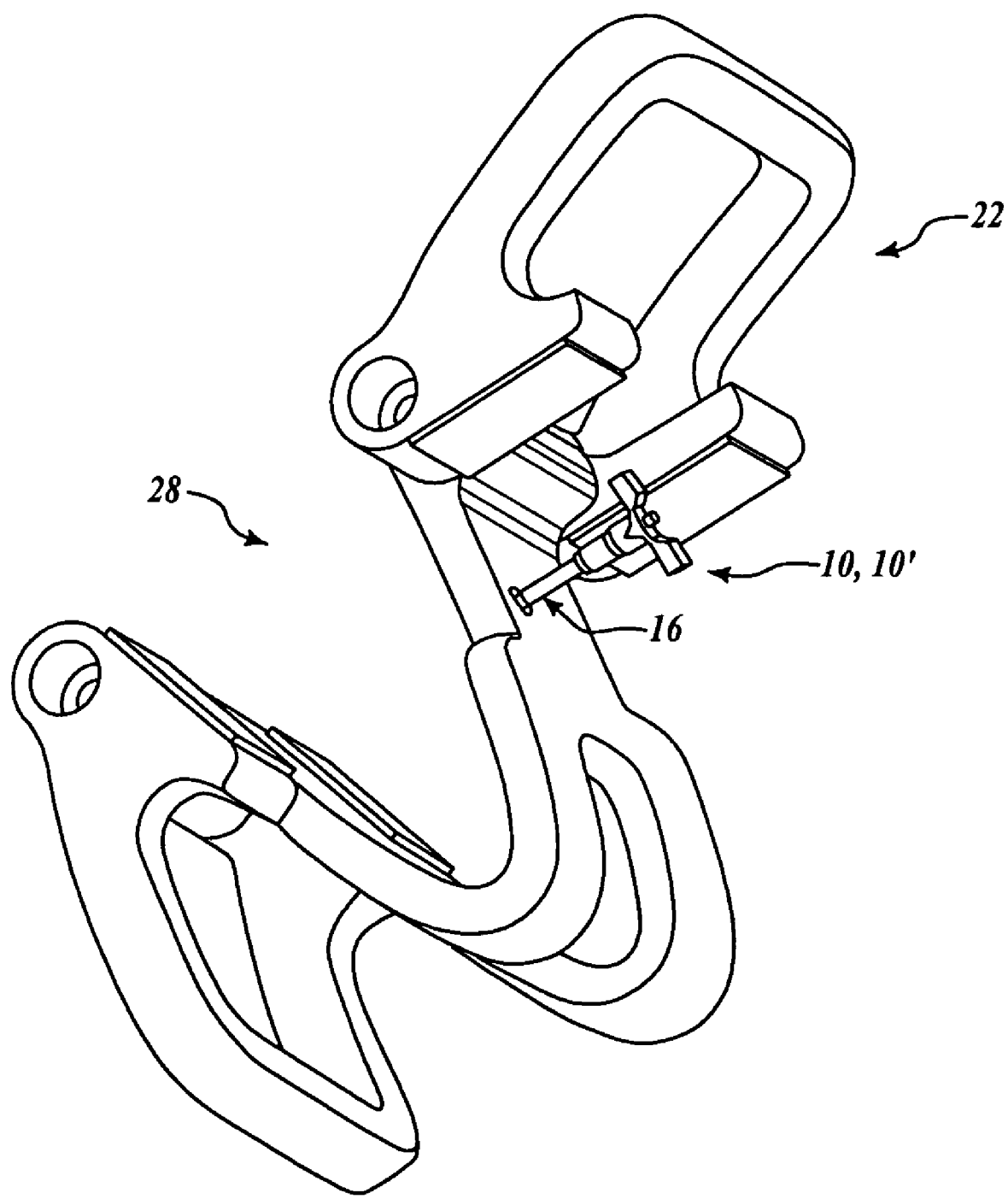
FIGS. 11A and 11B are perspective views of a locking pin inserted in different positions in two objects.

Referring now to FIG. 11A, the ball lock pin 10 or 10' can be held within the object 22 and the object 22 (with the ball lock pin 10 or 10' held therein) can be brought to the object. Because the ball lock pin 10 or 10' engages any of the exemplary bushings (not shown for purposes of clarity) contemplated herein, a reduction can be made in probability of the ball lock pin 10 or 10' being dropped or possibly lost while in transport to the object 28. With the ball lock pin 10 or 10' engaged within the bushing (not shown), the object 22 may be aligned with the object 28.

Figure 11B:
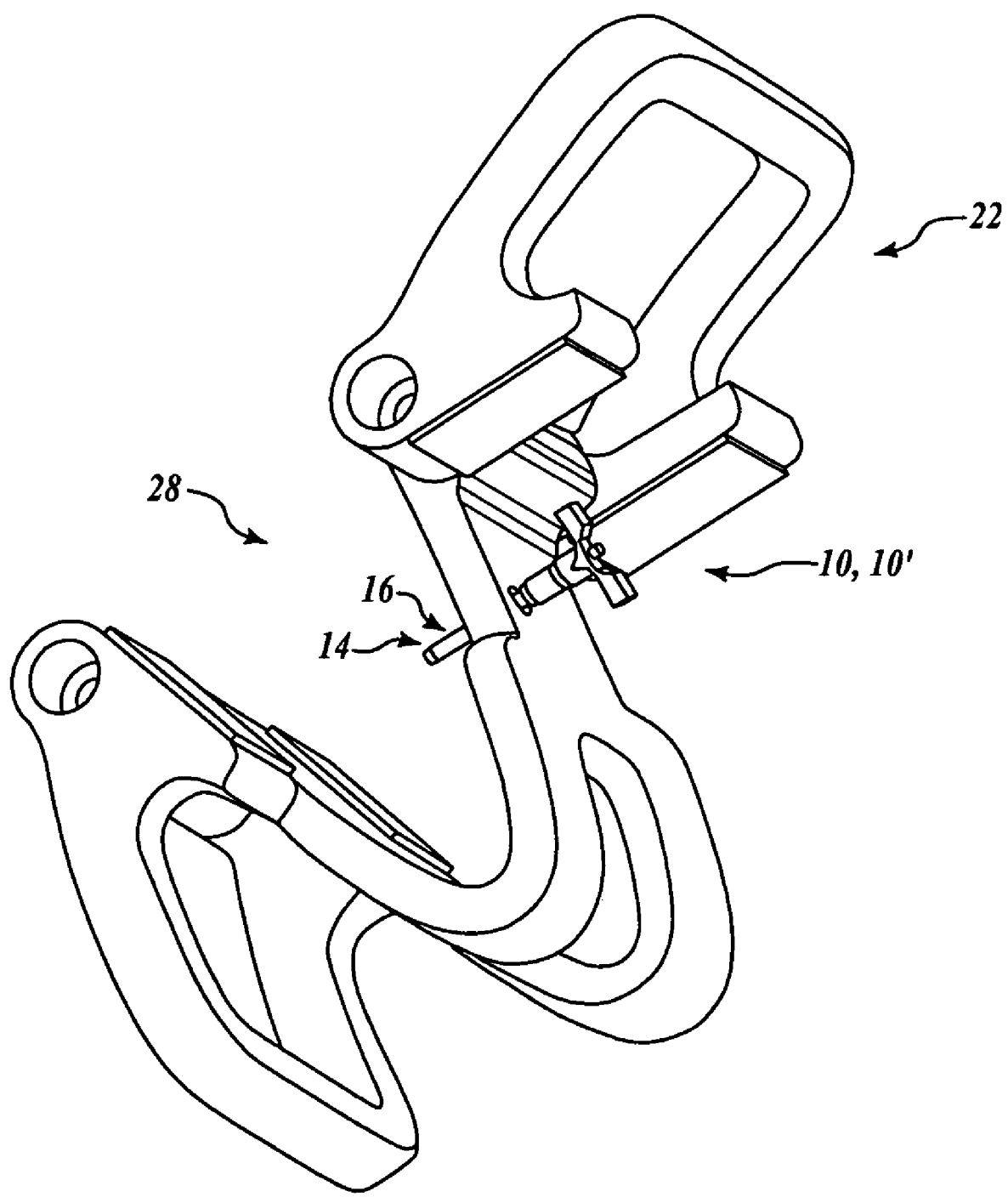

Referring now to FIG. 11B, the shaft 16 can be inserted into the object 28 and the locking balls 14 can be urged outwardly to engage the engagement portion (not shown for purposes of clarity) in the same manner as described above, Thus, the ball lock pin 10 can attach the objects 22 and 28.

It is again emphasized that the objects 22 and 28 may be any objects as desired for a particular application and are not intended to be limited in any manner whatsoever.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A retaining assembly for a ball lock pin, the retaining assembly comprising:
   a bushing assembly to attachably engage an object, the bushing assembly having:
      opposing ends of the bushing assembly, each of the opposing ends being open and sized for the ball lock pin to pass through; and
      an inner surface and an outer surface, the inner surface defining an engagement portion that includes a concave groove shaped to partially receive locking balls urged therein in engagement, and the outer surface being shaped to be received within an opening in the object and supporting a plurality of serrations that extend longitudinally between the opposing ends of the bushing assembly; and
   a lock ring that is receivable in a first radial groove of the bushing assembly to prevent the locking balls from being removed from the bushing assembly.

2. The retaining assembly of claim 1, wherein the concave groove is a second radial groove.

3. The retaining assembly of claim 1, wherein the bushing assembly includes a press fit bushing, the outer surface being further configured to be press fit into the opening in the object.

4. A retaining assembly for a ball lock pin, the retaining assembly comprising:
   a bushing assembly to attachably engage an object, the bushing assembly having:
      a body having a first length, the first length adapted to be shorter than a second length of a shaft of the ball lock pin;
      opposing ends of the bushing assembly, each of the opposing ends being open and sized for the shaft of the ball lock pin to pass through, the shaft of the ball lock pin being configured to extend through the body of the bushing assembly and beyond the body of the bushing assembly at one or more of the opposing ends;
      an inner surface, the inner surface defining an engagement portion that includes a first radial groove to receive locking balls urged therein in engagement, and further defining a second radial groove therein; and
      an outer surface, the outer surface being shaped to be received within an opening in the object and supporting a plurality of serrations that extend longitudinally between the opposing ends of the bushing assembly; and
   a lock ring that is receivable in the second radial groove to prevent the locking balls from being removed from the bushing assembly.

5. The retaining assembly of claim 4, wherein the bushing assembly includes a press fit bushing, the outer surface being further configured to be press fit into an object.

6. An assembly for attaching objects, the assembly comprising:
   a ball lock pin having a plurality of locking balls; and
   a bushing assembly configured to attachably engage an object and to receive the ball lock pin, the bushing assembly having:
      opposing ends, each of the opposing ends of the bushing assembly being open and sized for the ball lock pin to pass through;
      an inner surface and an outer surface, the inner surface defining an engagement portion configured to receive the plurality of locking balls urged therein in engagement and defining a radial lock groove, and the outer surface being shaped to be received within an opening in the object and supporting a plurality of serrations that extend longitudinally between the opposing ends of the bushing assembly; and
   a lock ring that is receivable in the radial lock groove to prevent the plurality of locking balls from being removed from the bushing assembly.

7. The assembly of claim 6, wherein the bushing assembly includes a press fit bushing, the outer surface being further configured to be press fit into the opening in the object.

8. A method comprising:
   inserting a ball lock pin into a bushing assembly, the ball lock pin having a plurality of locking balls, the bushing assembly configured to attachably engage a first object and to receive the ball lock pin, the bushing assembly including:
      opposing ends, each of the opposing ends of the bushing assembly being open and sized for the ball lock pin to pass through;
      an inner surface and an outer surface, the inner surface defining an engagement portion configured to receive the plurality of locking balls urged therein in engagement and defining a radial lock groove, and the outer surface being shaped to be received within an opening in the first object and supporting a plurality of serrations that extend longitudinally between the opposing ends of the bushing assembly; and a lock ring that is receivable in the radial lock groove to prevent the plurality of locking balls from being removed from the bushing assembly;

inserting the ball lock pin through the bushing assembly;

inserting the ball lock pin into a hole in a second object, sides of the hole defining a second engagement portion to receive the plurality of locking balls; and withdrawing the ball lock pin until the plurality of locking balls engage with the first engagement portion, the ball lock pin being secured to the first object when the ball lock pin engages only the inner surface of the bushing assembly.

9. The method of claim 8, wherein engaging the plurality of locking balls with the second engagement portion secures the first object to the second object.

10. The method of claim 8, further comprising securing the outer surface to the first object.

11. The method of claim 8, further comprising, after inserting the ball lock pin through the bushing assembly, inserting the lock ring into the radial lock groove to prevent the plurality of locking balls from being removed from the bushing assembly.

* * * * *